United States Patent [19]

Veligdan

[11] Patent Number: 5,668,907
[45] Date of Patent: Sep. 16, 1997

[54] THIN OPTICAL DISPLAY PANEL

[75] Inventor: James Thomas Veligdan, Manorville, N.Y.

[73] Assignee: Associated Universities, Inc., Washington, D.C.

[21] Appl. No.: 584,045

[22] Filed: Jan. 11, 1996

[51] Int. Cl.$^6$ .................................................. G02B 6/04
[52] U.S. Cl. .......................... 385/120; 385/115; 385/116
[58] Field of Search .......................... 385/120, 115–119, 385/121

[56] References Cited

U.S. PATENT DOCUMENTS

| | | | |
|---|---|---|---|
| 3,836,809 | 9/1974 | Condon | 385/120 X |
| 3,907,403 | 9/1975 | Maeda | 385/120 |
| 4,309,070 | 1/1982 | St. Leger Searle | 350/3.7 |
| 4,711,512 | 12/1987 | Upatnieks | 350/3.7 |
| 5,224,198 | 6/1993 | Jachimowicz et al. | 385/133 |
| 5,291,184 | 3/1994 | Iino | 345/7 |
| 5,341,230 | 8/1994 | Smith | 359/13 |
| 5,369,415 | 11/1994 | Richard et al. | 345/6 |
| 5,381,502 | 1/1995 | Veligdan | 385/115 |

Primary Examiner—Phan T. H. Palmer
Attorney, Agent, or Firm—Margaret C. Bogosian

[57] ABSTRACT

An optical display includes a plurality of optical waveguides each including a cladding bound core for guiding internal display light between first and second opposite ends by total internal reflection. The waveguides are stacked together to define a collective display thickness. Each of the cores includes a heterogeneous portion defining a light scattering site disposed longitudinally between the first and second ends. Adjacent ones of the sites are longitudinally offset from each other for forming a longitudinal internal image display over the display thickness upon scattering of internal display light thereagainst for generating a display image. In a preferred embodiment, the waveguides and scattering sites are transparent for transmitting therethrough an external image in superposition with the display image formed by scattering the internal light off the scattering sites for defining a heads up display.

20 Claims, 3 Drawing Sheets

THIN OPTICAL DISPLAY PANEL

BACKGROUND OF THE INVENTION

The present invention relates generally to optical displays, and, more specifically, to a heads up display.

In a vehicle such as an automobile or aircraft, an operator sits behind an instrument panel and windshield for controlling operation of the vehicle. The instrument panel contains various instruments of interest in operating the vehicle, including a velocity indicator for example. In order to allow the operator or observer to maintain constant observation of the external environment beyond the windshield, it is desirable to provide a heads up display (HUD) which superimposes desired instrument information over external images transmitted through the windshield so that both may be viewed simultaneously.

In a typical application, a HUD panel is positioned between the observer and the windshield and must be transparent for allowing external images to be seen by the observer directly through the panel. The panel and the windshield are two separate entities since the HUD panel is a sophisticated device for projecting an image therein while at the same time allowing external images to be seen. A typical HUD panel is a flat glass plate with reflective and non-reflective coatings on opposite sides for allowing simple reflection of a cathode ray tube (CRT) image while allowing external viewing. In another example, optical gratings are used for diffracting internal light at an outlet aperture of a glass plate for viewing by the observer. Since diffraction is directional in this HUD panel, the observer's field of view is limited, and therefore requires an optimum position of observation for clearly viewing the display image.

SUMMARY OF THE INVENTION

An optical display includes a plurality of optical waveguides each including a cladding bound core for guiding internal display light between first and second opposite ends by internal reflection. The waveguides are stacked together to define a collective display thickness. Each of the cores includes a heterogeneous portion defining a light scattering site disposed longitudinally between the first and second ends. Adjacent ones of the sites are longitudinally offset from each other for forming a longitudinal internal image display over the display thickness upon scattering of internal display light thereagainst for generating a display image. In a preferred embodiment, the waveguides and scattering sites are transparent for transmitting therethrough an external image in superposition with the display image formed by scattering the internal light off the scattering sites for defining a heads up display.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
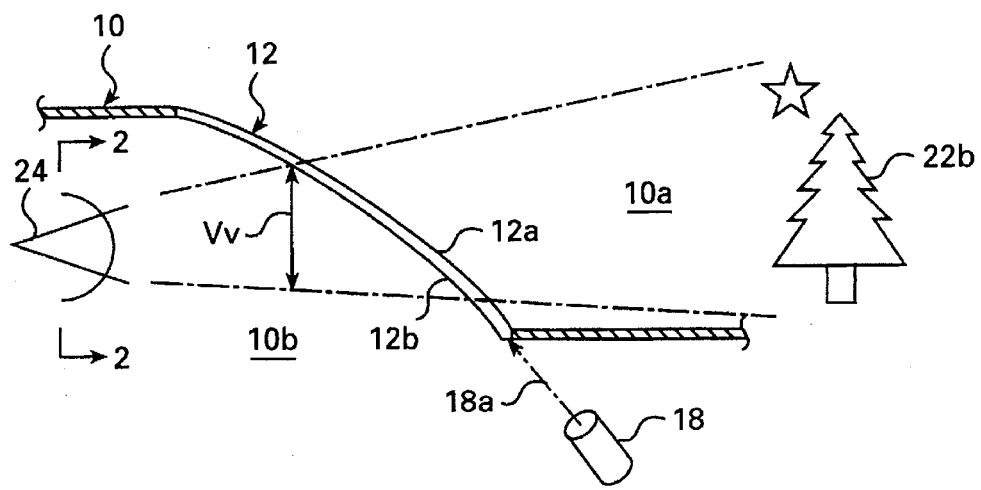
FIG. 1 is a schematic, elevational sectional view of an exemplary vehicle having an optical display in the form of a windshield for superimposing a display image over external images.

Illustrated schematically in FIG. 1 is an exemplary vehicle 10 which may take any conventional form, including an automobile, truck, or aircraft, and includes an optical display or panel 12 in accordance with one embodiment of the present invention suitably mounted around its perimeter in the vehicle 10. In the exemplary embodiment illustrated in FIG. 1, the optical display 12 defines a windshield with an outer face 12a facing outwardly for contacting the vehicle external environment 10a, and an opposite inner face 12b facing inwardly into the vehicle 10 for contacting the internal compartment environment 10b thereof.

Figure 2:
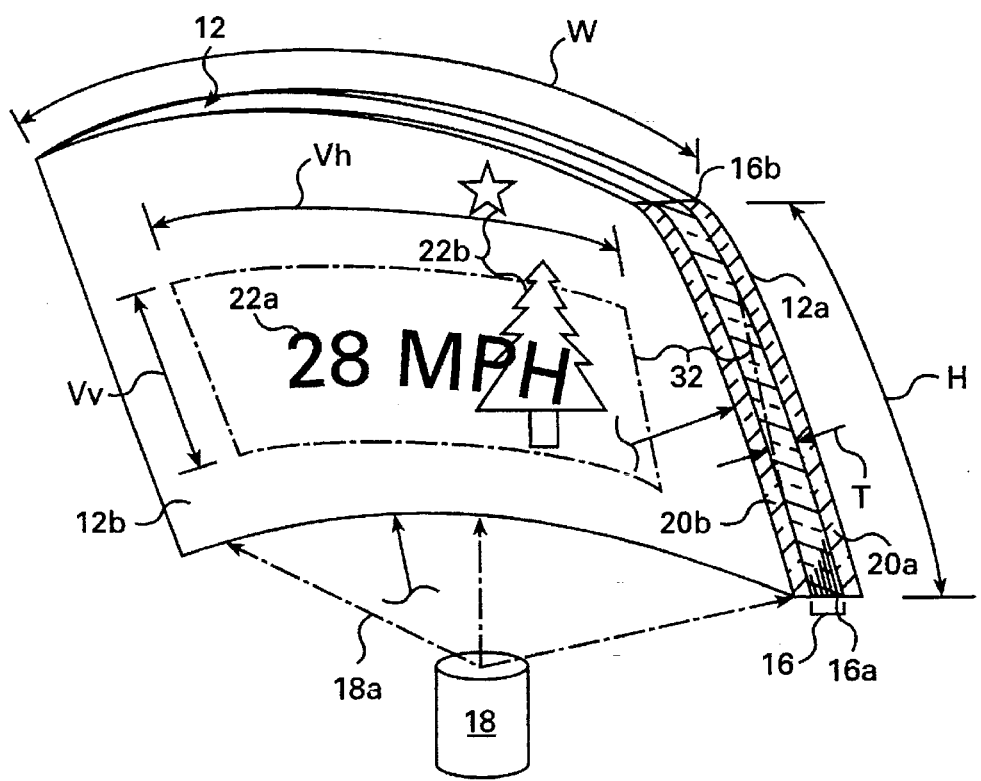
FIG. 2 is a schematic view of the optical display shown in FIG. 1 in accordance with an exemplary arcuate embodiment illustrating a display image superimposed over external images, and taken generally along line 2—2.

As shown in more particularity in FIG. 2, the optical display 12 includes a plurality of light channeling optical waveguides 16 in accordance with the present invention which guide internal display light 18a from a suitable light projector or source 18 between first and second opposite ends 16a and 16b of the waveguides 16 by total internal reflection. The light projector 18 may take any suitable configuration including a conventional laser for providing relatively high intensity collimated display light 18a into the bottom ends 16a of the waveguides which is projected upwardly therethrough toward the top ends 16b thereof.

In an alternate embodiment, the light projector 18 may include a conventional cathode ray tube (CRT) which directly provides imaging light which is preferably transmitted through a pair of cylindrical lenses for providing horizontal and vertical focusing of the image along the bottom ends 16a of the waveguides 16.

In the exemplary embodiment illustrated in FIG. 2, the optical display 12 defines the front windshield of the vehicle 10 illustrated in FIG. 1, and preferably also includes a pair of outer and inner transparent glass laminates 20a and 20b suitably integrally bonded to and sandwiching the plurality of waveguides 16 to define the outer and inner faces 12a and 12b. The glass laminates 20a,b provide a hard, scratch resistant surface for maintaining good visual performance of the windshield in a vehicle application.

In the exemplary embodiment illustrated in FIG. 2, the windshield including the glass laminates 20a,b and waveguides 16 are arcuate both vertically and horizontally for use in a typical vehicular application such as an automobile or aircraft. In an alternate embodiment illustrated in FIG. 3, the optical display windshield, designated 12A, including the glass laminates 20a,b and waveguides 16, may be completely flat if desired. The curvature or flatness of the optical panel does not affect its ability to project a suitable internal image therein, and, therefore, the following description of the optical panel applies equally as well to the arcuate panel illustrated in FIGS. 1 and 2 and the flat panel illustrated in FIG. 3, and they are therefore referred to interchangeably herein.

Figure 4:
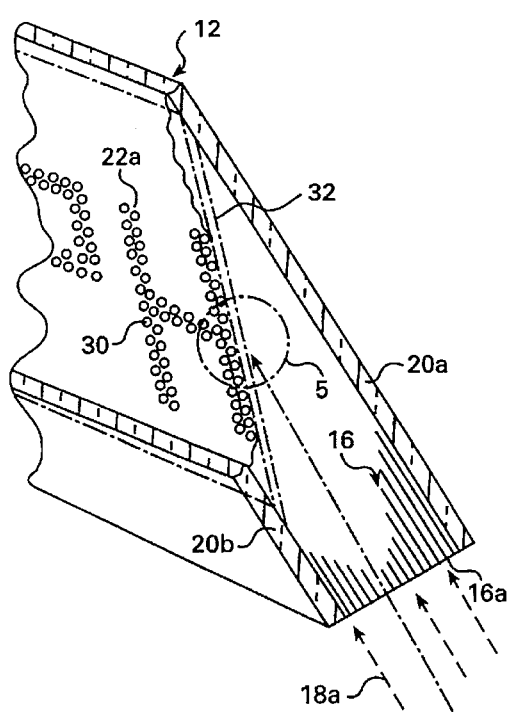
FIG. 4 is an enlarged, partly sectional view of a portion of the optical panel shown in FIG. 2 illustrating projection of an internal display image at a plurality of light scattering sites provided in a plurality of stacked optical waveguides.
Figure 5:
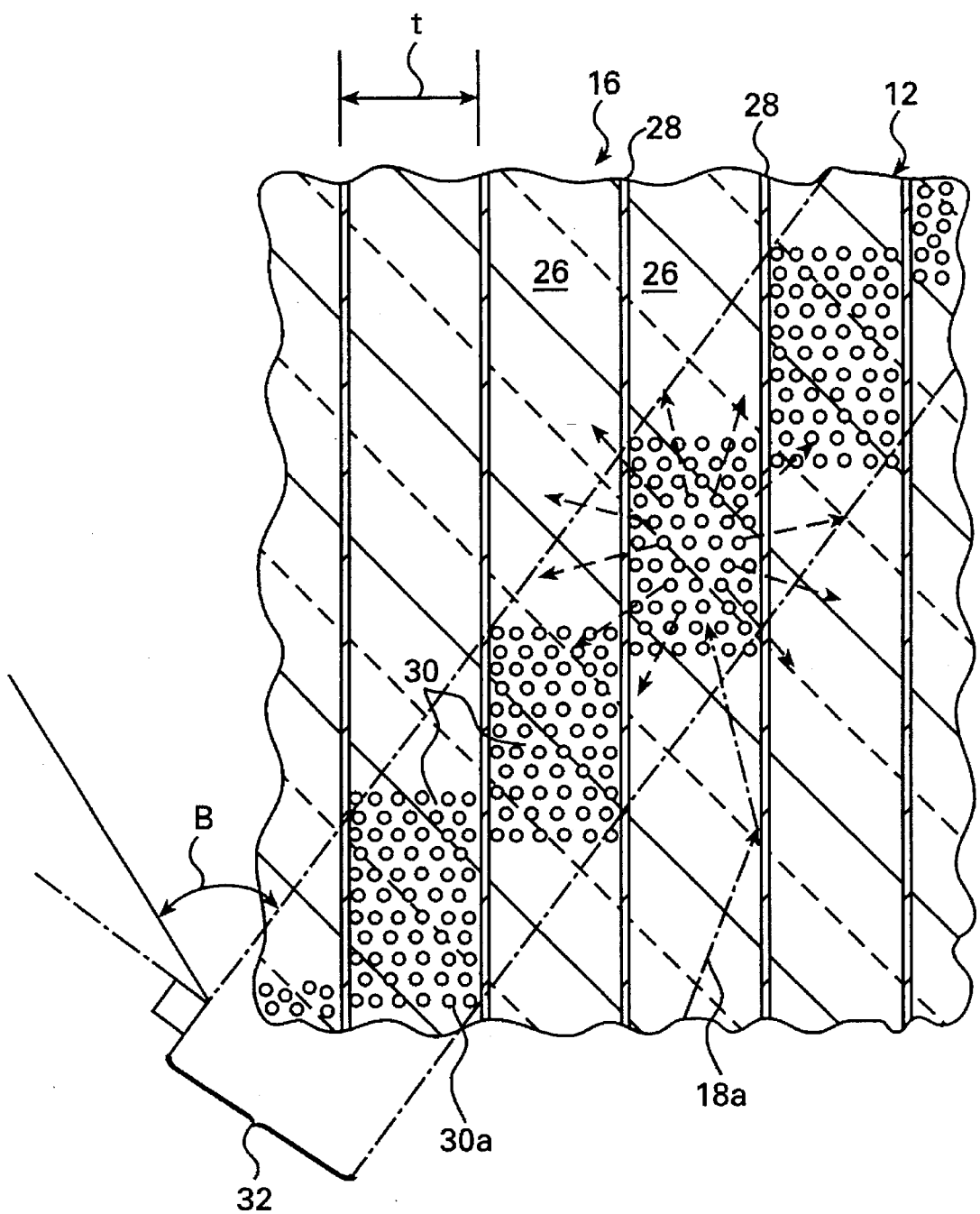
FIG. 5 is an enlarged, elevational sectional view of a portion of adjacent waveguides shown in FIG. 4 within the circle labeled 5 illustrating scattering of internal display light for forming picture elements of the display image.

FIG. 4 illustrates in more particularity an exemplary section of either the arcuate or flat displays 10, with FIG. 5 illustrating an enlarged portion of exemplary adjacent ones of the waveguides 16 in which the internal display light 18a is internally reflected and scattered in accordance with the present invention for projecting an internal display image. More specifically, FIG. 2 illustrates an exemplary internal display image 22a which may take any suitable form such as the velocity indication shown for example. FIG. 2 also illustrates that the optical display 12 is transparent so that an external image 22b may be viewed therethrough, with the display image 22a being therefore superimposed over the external image 22b. In this embodiment, the optical display 12 defines a heads up display (HUD) for allowing an operator or observer 24 in the vehicle 10 illustrated in FIG. 1 to view not only the external images 22b found in front of the windshield display 12, but also any suitable display images 22a projected inside the windshield display 12 itself.

An enlarged portion of the display 12 is illustrated schematically in FIG. 5, and shows adjacent waveguides 16 stacked transversely together front-to-back, between the waveguide first and second ends 16a,b as shown in FIG. 2 to define a collective display thickness T. Each waveguide 16, as illustrated in FIG. 5, includes a transparent core 26 and bounding cladding layer 28 for guiding the display light 18a between the first and second opposite ends 16a,b of the waveguide 16 by total internal reflection. The cores 26 and cladding layers 28 may take any suitable form such as optical plastic and epoxy, respectively. The cladding layer 28 has an index of refraction which is less than the index of refraction of the core 26 for providing total internal reflection as the display light 18a is transmitted through the cores 26 at suitably low incidence angles. In the exemplary embodiment illustrated in FIGS. 2–4, the waveguide first ends 16a are coplanar and suitably polished to define an input face for coupling or receiving the display light 18a from the light projector 18, and transmitting the display light into respective ones of the cores 26 for being reflected therealong from the first ends 16a toward the second or top ends 16b.

Referring again to FIG. 5, each of the cores 26 is preferably homogeneous except for a preselected heterogeneous portion defining a light scattering center or site 30 disposed at a suitable location longitudinally between the waveguide first and second ends 16a,b. Adjacent sites 30 are preferably longitudinally offset from each other for collectively forming a longitudinal internal image display 32 which extends over the display thickness T. The scattering sites 30 may take any suitable form for scattering the display light 18a thereagainst for generating the internal display image 22a. As shown in FIG. 4, the display light 18a is projected into the waveguide first ends 16a and is reflected internally inside each core 26 until it reaches respective ones of the scattering sites 30 at which the light is scattered in all directions and therefore effects a local glowing spot due to light scattering. The scattering site 30 provides a local difference in index of refraction for reflecting or scattering the light.

As shown in FIG. 5, each scattering site 30 and each core 26 define a single picture element or pixel, with the resolution of the display image 22a in this transverse direction being defined by the number of cores 26 stacked together within the overall thickness T. For example, about 525 cores 26 may be stacked together in about 2.54 cm collective thickness T. The epoxy cladding layer 28 may be about 1–2 microns thick, with each core 26 being about 46–47 microns thick, and with each waveguide 16 having a thickness t represented by the thickness of the core 26 and a half portion of each cladding layer 28 sandwiching each core 26.

In the exemplary embodiment illustrated in FIG. 2, the number of waveguides 16 along the thickness T direction of the display 12 determines the vertical resolution of the display image 22a. In the preferred embodiment illustrated in FIG. 2, the waveguides 16 are in the form of sheets or ribbons which are laterally continuous along the full width W of the display 12. Each waveguide 16 is also longitudinally continuous and extends the full height H of the display 12 between the first and second ends 16a,b of the waveguides 16. Horizontal resolution is defined by the individual spot sizes generated by the light projector 18 in the horizontal direction.

The image display 32 illustrated in FIG. 2 may be positioned wherever desired within the optical display 12 by preferably locating the individual scattering sites 30 as desired. In the exemplary embodiment illustrated in FIG. 2, scattering sites 30 are provided in each of the cores 26 in each of the waveguides 16 from the outer to inner faces of the display 12a,b. And, scattering sites 30 are repeated or extend laterally along the width of the waveguides 16 for extending the image display 32 laterally in the width direction. The resulting exemplary image display 32 illustrated in FIG. 2 is preferably rectangular and may be centered within a suitable field of view of the observer 24 illustrated in FIG. 1.

Figure 3:
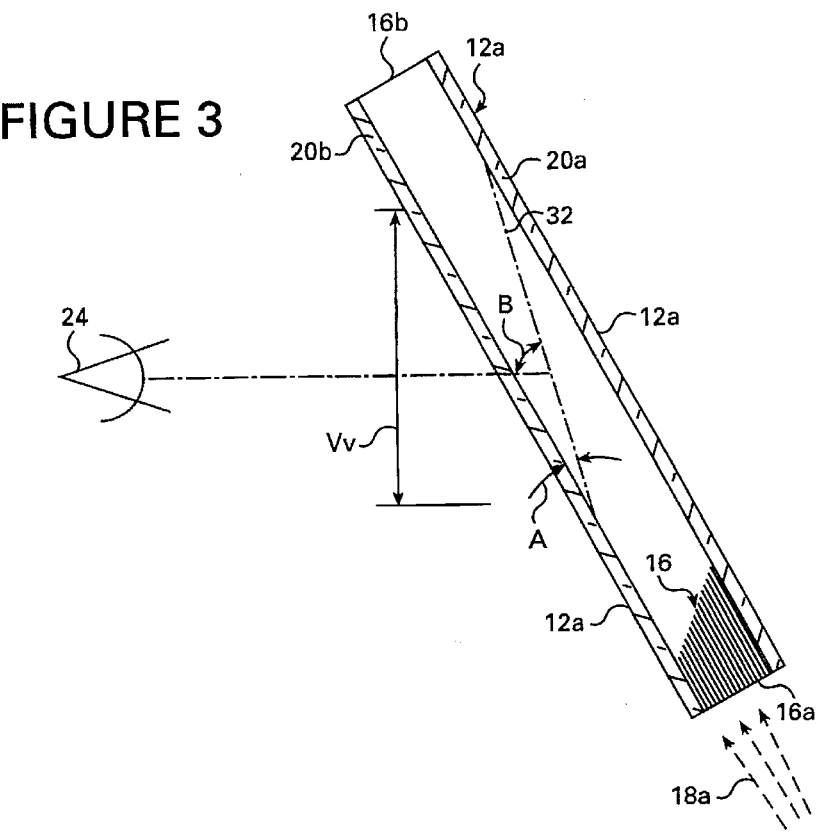
FIG. 3 is an elevational, partly sectional view of the optical display illustrated in FIG. 2, in flat form, sandwiched between a pair of glass laminates in accordance with another embodiment of the present invention.

In the exemplary windshield application illustrated in FIG. 1, the optical display 12 is tilted rearwardly in the vehicle 10, with the image display 32 illustrated in FIG. 2 being positioned relative to the observer 24, so that the observer 24 has any suitable vertical and horizontal field of view designated $V_v$ and $V_h$. This may be obtained by positioning the several scattering sites 30 coplanar for defining a correspondingly coplanar image display 32, which in the exemplary embodiment illustrated in FIG. 2 is generally rectangular. As shown in FIG. 3, the image display 32 extends longitudinally along the waveguides 16 and defines a diminutive acute intersection angle A with respective ones of the waveguides 16 for being generally parallel with the waveguides 16. For example, the intersection angle A may be as small as about 2° or less for extending the vertical field of view $V_v$ correspondingly. The smaller the intersection angle A becomes, the larger the vertical field of view becomes, and the smaller the display thickness T becomes. The resulting image display 32 is therefore substantially perpendicular to the input face defined by the waveguide first ends 16a.

In the exemplary embodiment illustrated in FIG. 2, the waveguides 16 are arcuate both longitudinally and laterally, and the image display 32 is correspondingly arcuate both longitudinally and laterally. In the embodiment illustrated in FIG. 3, the waveguides 16 are flat, and correspondingly the image display 32 is also flat. In either embodiment, the waveguides 16 are nevertheless effective for internally reflecting the image light 18a therethrough until the light is scattered off the several scattering sites 30 for developing the resulting display image 22a.

Since the scattering sites 30 collectively define a flat or arcuate image display 32 in a common plane as illustrated in FIG. 5, the optimum viewing angle of the display image 22a being formed thereby is generally perpendicular thereto for best viewing the displayed image. In the exemplary embodiment illustrated in FIG. 3, the optical display 12A is tilted rearwardly from the vertical as required in a typical vehicle application for providing an aerodynamically smooth windshield, and the actual incident viewing angle B may not be perpendicular to the image display 32, but may be smaller. However, the display image 22a formed on the image display 32 is nevertheless readily viewable from any angle, other than being parallel with the image display 32, with only the viewing projection of the image being affected. The observer 24 therefore has a virtually unlimited field of view both vertically and horizontally within the limited confines of the vehicle 10 for viewing the image display 32.

As shown in FIG. 2, the waveguides 16, as well as the scattering sites 30 within the image display 32, are optically transparent through the display thickness T for transmitting therethrough the external image 22b in superposition with the display image 22a formed by scattering the internal light off the scattering sites 30. In the HUD embodiment illustrated in FIG. 2, the waveguides 16 are transparent to visual light, and the scattering sites 30 of the image display 32 are sized to scatter internal visual light 18a for superimposing the internal visual display image 22a over the external visual display image 22b. In this way, the observer 24 can visually view both the display and external images 22a,b simultaneously without requiring the need to divert viewing downwardly inside the vehicle 10 to the conventional instrument panel thereof (not shown). In alternate embodiments, the optical display 12 may be configured for transmitting and scattering other wavelengths of electromagnetic radiation.

FIG. 5 illustrates an exemplary embodiment of suitable scattering sites 30 which may comprise a plurality of microscopic bubbles 30a which provide a different index of refraction than the core 26. Since each core 26 has a thickness less than about 50 microns in the exemplary embodiment, a single bubble 30a of this size may be provided therein. However, in the exemplary embodiment illustrated in FIG. 5, each scattering site 30 itself comprises a suitable plurality of microscopic bubbles 30a each of which is substantially smaller than the thickness t of each waveguide 16 and is thus not visible to the naked eye. The bubbles 30a are found in each of the cores 26, in preferably a plurality of longitudinal layers of the bubbles.

The bubbles 30a may be formed in the extruding process of the plastic cores 26 by temporarily introducing a heterogeneous portion in the otherwise homogeneous core 26 by air injection or chemical reactions which produce the bubbles. The bubbles 30a need only provide a different index of refraction than the core 26 to reflect light, and therefore may be simple air or polymer bubbles for example. Since the scattering sites 30 scatter the incident display light 18a being guided through each of the cores 26, only one scattering site 30 is required or desired in each of the cores 26. The scattering sites 30 from core-to-core are suitably aligned with each other to define the image display 32 as being generally coplanar, with each scattering site 30 defining a corresponding pixel for effecting vertical resolution.

FIG. 4 illustrates the projection of the exemplary letter "H" in the display image 22a along the image display 32. The display light 18a is suitably scanned across the several cores 26 of the individual waveguides 16 for forming the vertical resolution of the image. The display light 18a is similarly scanned along the width of the waveguides 16 for creating the horizontal extent of the pixels and the corresponding horizontal resolution of the image. The scattering sites 30 are therefore made to scatter the display light 18a to form individual glowing pixels which collectively form the display image 22a.

Since the scattering sites 30 are relatively small, they allow visual transmission of the external image 22b therethrough with generally no discernable scattering thereof. However, the display light 18a is preferably as bright as practical, and brighter than the external light, so that scattering of the display light is readily viewable by the observer 24 in superposition over the external image 22b. The light projector 18 in the form of a suitable laser can provide a high brightness and high contrast display image 22a readily viewable over the external image 22b. The light source 18 in the form of a conventional cathode ray tube has less brightness, but is nevertheless effective for projecting a suitable image having acceptable brightness relative to the external image 22b.

In this way, the internal display image 22a is readily formed by simply projecting the internal light image 22a through the stacked optical waveguides 16 for transmission therein by internal reflection to the scattering sites 30. The scattering of the internal light inside the waveguides 16 creates the internal display image 22a which is visible by the observer 24 through the inner glass laminate 20b. The waveguides 16 are visually transparent for transmitting the external image 22b therethrough, with the internal image 22a being superimposed thereon for forming a heads up display.

Although the heads up display may be formed integrally with the windshield in a vehicle application, it may be separately configured and spaced therefrom if desired. However, in an integral assembly, the plastic layers of the waveguides 16 and the glass laminates 20a,b can provide a simpler combination with inherent safety glass impact resistance.

Since the improved optical display 12 disclosed above relies on internal scattering of the display light 18a being reflected internally within each waveguide core 26, it may have any suitable configuration for effecting this purpose. The exemplary bubbles 30a disclosed are relatively simple to effect. In one laboratory embodiment built and tested, an integral stack of waveguides were cut diagonally at an intermediate location and glued together with a conventional epoxy. Stirring of the initial epoxy mixture created suitable microscopic air bubbles therein which upon curing of the epoxy to reattach the severed waveguides together created an effective plane of scattering sites for producing the display image. In a production environment, the scattering sites 30 may be formed in the extrusion process of the individual cores 26 by providing a suitable heterogeneous portion therein, which is suitably aligned with corresponding portions of adjacent cores for defining the image display 32.

Although the optical display 12 has been described with respect to an exemplary heads up display, it may be used in any suitable application for forming either the internal image display 32 itself, or in combination with transversely transparent waveguides 16 which allow simultaneous transmission of external light through the thickness of the collective waveguides 16. For example, the display 12 may also be used to simultaneously display one image in front of another image, like that provided by a cathode ray tube, or by a liquid crystal display (LCD) panel.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. An optical display 12 comprising a plurality of optical waveguides 16 each including a core 26 and bounding cladding layer 28 for guiding internal display light 18a between first and second opposite ends 16a,b thereof by internal reflection;

said waveguides 16 being stacked together between said first and second ends 16a,b to define a collective display thickness; and each of said cores 26 including a heterogeneous portion defining a light scattering site 30 disposed longitudinally between and spaced from said first and second ends 16a,b, with adjacent ones of said sites 30 being longitudinally offset from each other for forming a longitudinal internal image display 32 over said display thickness for scattering said internal display light 18a thereagainst for generating a display image 22a.

2. A display according to claim 1 wherein said waveguide first ends 16a define an input face for receiving said display light 18a and transmitting said display light into respective ones of said cores 26 for being reflected therealong to said scattering sites 30.

3. A display according to claim 2 wherein said waveguides 16 are in the form of ribbons having a width, and said sites 30 extend laterally along said ribbons for extending said display laterally.

4. A display according to claim 3 wherein said scattering sites 30 in said plurality of cores 26 are substantially coplanar for defining a coplanar image display 32.

5. A display according to claim 4 wherein said waveguides 16 and said scattering sites 30 are transparent through said display thickness for transmitting therethrough an external image 22b in superposition with said display image 22a formed by scattering said display light off said scattering sites 30.

6. A display according to claim 5 wherein said waveguides 16 are transparent to visual light, and said scattering sites 30 are sized to scatter internal visual light 18a for superimposing an internal visual image 22a over an external visual image 22b.

7. A display according to claim 6 defining a transparent windshield with an outer face 12a facing outwardly for contacting an external environment 10a, and an opposite inner face 12b facing inwardly for contacting an internal environment 10b of a vehicle 10.

8. A windshield according to claim 7 further comprising a pair of outer and inner glass laminates 20a,b integrally bonded to and sandwiching said plurality of waveguides 16 to define said outer and inner faces 12a,b.

9. A windshield according to claim 8 wherein said glass laminates 20a,b and waveguides 16 are arcuate both vertically and horizontally.

10. A windshield according to claim 9 herein said scattering sites 30 in each of said cores 26 comprise a plurality of microscopic bubbles 30a.

11. A windshield according to claim 10 in combination with a light projector 18 optically aligned with said waveguide first ends 16a for projecting said display light through said core 26 for creating said display image 22a on said image display 32.

12. A display according to claim 4 wherein said scattering sites 30 comprise a plurality of microscopic bubbles 30a.

13. A display according to claim 12 wherein said scattering sites 30 in each of said cores 26 comprise a plurality of microscopic bubbles 30a.

14. A display according to claim 13 wherein said scattering sites 30 in each of said cores 26 comprise a plurality of layers of bubbles.

15. A display according to claim 4 wherein said waveguides 16 are arcuate, and said image display 32 is arcuate.

16. A display according to claim 15 wherein said waveguides 16 are arcuate both longitudinally and laterally, and said image display 32 is arcuate both longitudinally and laterally.

17. A display according to claim 4 wherein said image display 32 extends longitudinally along and generally parallel with said waveguides 16.

18. A display according to claim 4 wherein said waveguides 16 are flat, and said image display is flat.

19. A method of displaying an image 22a comprising:

projecting an internal light image 22a through a plurality of stacked together optical waveguides 16, each having a heterogeneous portion between the ends of the waveguide, for transmission therein by internal reflection between first and second ends 16a,b thereof; and scattering said internal light inside said waveguides 16 at a coplanar location that is spaced from said first and second ends to effect an internal image 22a at said heterogeneous portions.

20. A method according to claim 19 wherein said waveguides 16 are transparent for transmitting an external image therethrough, and further comprising superimposing said internal image 22a on said external image 22b.

* * * * *

UNITED STATES PATENT AND TRADEMARK OFFICE
CERTIFICATE OF CORRECTION

PATENT NO. : 5,668,907
DATED : September 16, 1997
INVENTOR(S) : James T. Veligdan It is certified that error appears in the above-identified patent and that said Letters Patent is hereby corrected as shown below:

Column 1, line 4, insert the following:
This invention was made with Government support under Contract No. DE-AC02-76CH00016 awarded by the U.S. Department of Energy. The Government has certain rights in this invention.

Signed and Sealed this

Twenty-second Day of December, 1998

Attest:

BRUCE LEHMAN

*Attesting Officer*　　　　*Commissioner of Patents and Trademarks*